No. 737,554.

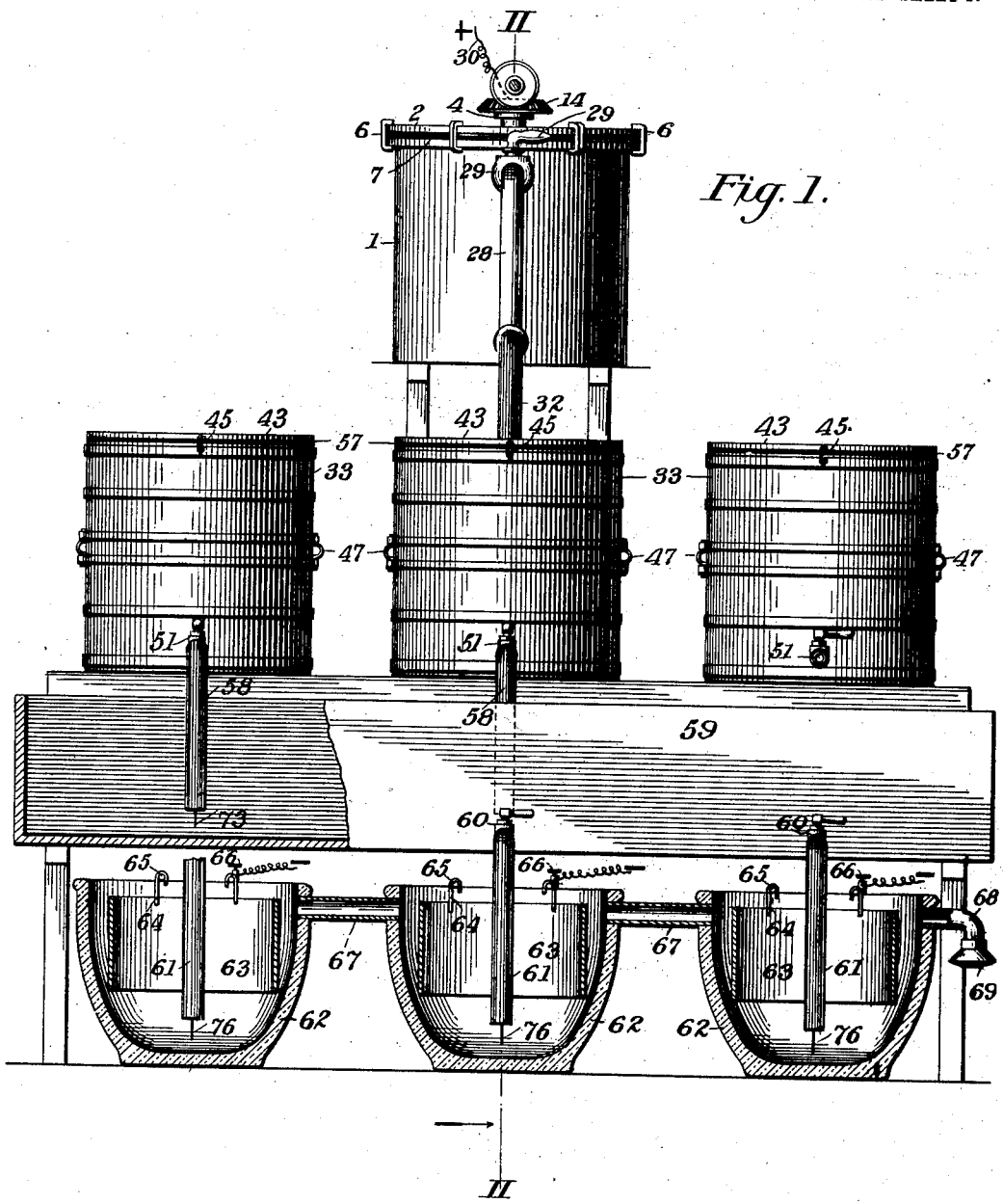

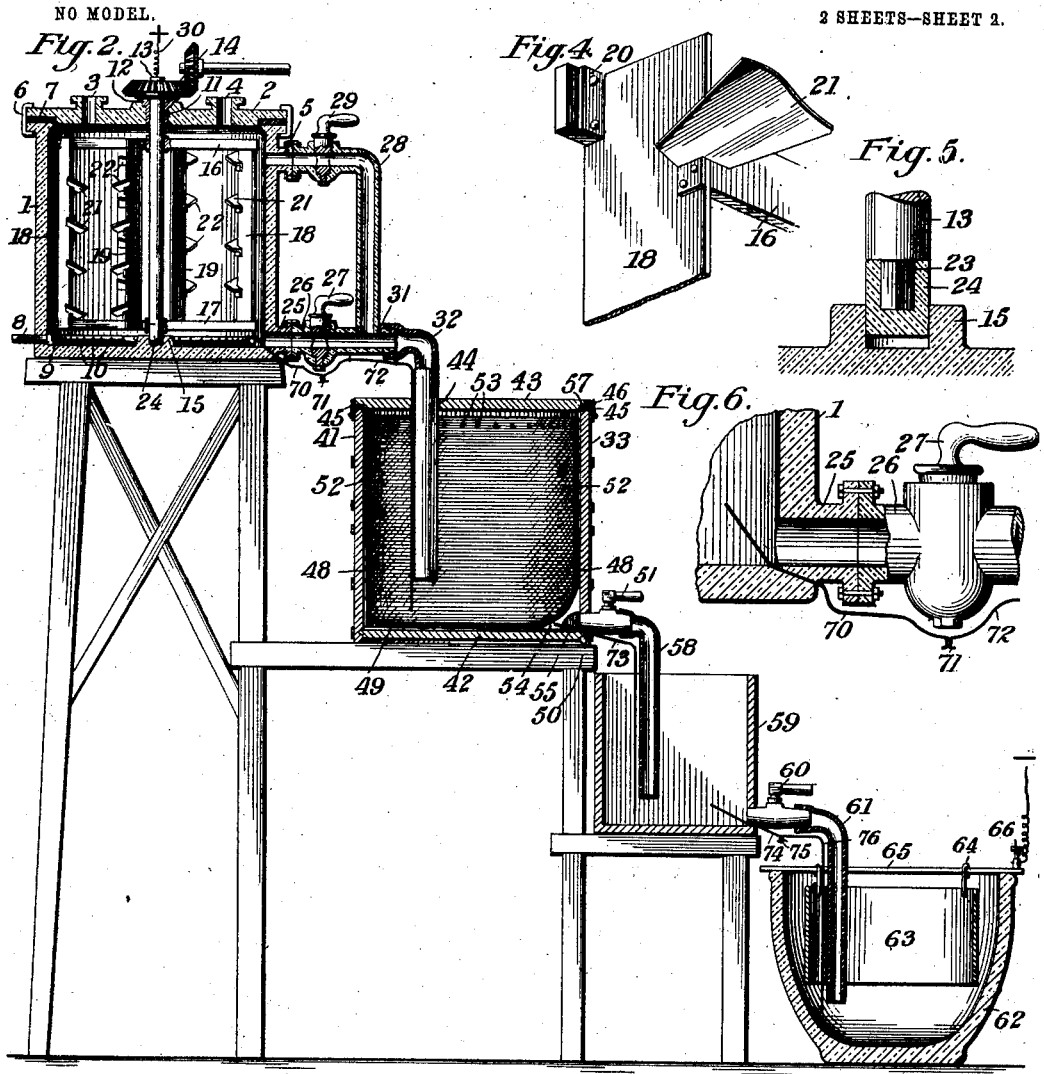

Patented August 25, 1903.

UNITED STATES PATENT OFFICE.

LINUS P. BURROWS, OF WASHINGTON, DISTRICT OF COLUMBIA.

ELECTROLYTIC APPARATUS.

SPECIFICATION forming part of Letters Patent No. 737,554, dated August 25, 1903.

Application filed January 22, 1902. Renewed January 2, 1903. Serial No. 137,571. (No model.)

*To all whom it may concern:*

Be it known that I, LINUS P. BURROWS, a citizen of the United States, residing at Washington, in the District of Columbia, have invented new and useful Improvements in Electrolytic Apparatus, of which the following is a specification.

This apparatus is especially intended for the treatment of ores, and comprises means for dissolving the values in the ores by the aid of electricity and means for filtering and electrolyzing the solution so obtained, the ore-pulp in the dissolving vessel and the solutions in the filters and electrolytic cells being also heated by the passage of the electric current.

Referring to the accompanying drawings, Figure 1 is a front elevation, partly in section. Fig. 2 is a transverse vertical section taken on line II II of Fig. 1. Fig. 3 is a detail plan view showing parts of the apparatus in section. Figs. 4, 5, and 6 are detail views.

The dissolving apparatus consists of a containing vessel 1, the material of which is suited to the leaching or other solution to be held therein. The material shown is vitrified earthenware, and the cover 2 is the same material. The cover has suitable inlet-openings 3 4, and the vessel has outlet-openings 5 25. The cover is secured upon the vessel by clamps 6, a packing 7, of rubber, being interposed. Through the side of the vessel at its base passes a steam-supply pipe 8, which is connected to a circular coil 9 near the bottom of the vessel. This coil has small openings 10, preferably in its upper inner wall, to permit the injection of live steam into the contents of the vessel. The cover has a central opening 11, within which is arranged a metal bushing 12, serving as a journal and support for a shaft 13 and bevel-gear 14. The shaft 13 is guided at its lower end by a recess in a boss 15, rising from the bottom of the vessel. Shaft 13 carries near its upper and lower ends two sets of radial arms 16 17, shown as four in number, the arms of the upper set being disposed directly above those of the lower set. These arms carry vertical stirring-plates 18 19. These plates are secured by rivets 20 or otherwise to the upper and lower arms, the two plates carried by each pair of arms being spaced apart, but converging toward each other as they recede from the arms. To the rear edges of each plate are secured a number of blades 21 22, each of which extends rearwardly or outwardly from its supporting-plate in a general horizontal direction. The blades 21 on outer vertical plates 18 and the blades 22 on inner vertical plates 19 have their adjacent inner edges twisted downwardly, giving the blades a helical curve transversely. The corresponding blades which are carried by each pair of vertical plates are in substantially the same horizontal plane. The several pairs of blades on the vertical plates 18 19 which follow next after the first set are respectively situated at a higher level than those of the first set, and the same is true of the blades of each succeeding set, the difference of elevation depending on the number of radial arms and being such that all of the blades substantially form an interrupted helical screw, the pitch of which is equal to the distance between any adjoining superposed blades. There being four sets of radial arms in the construction shown, the horizontally-alined blades of each pair are situated above the blades of the preceding pair by a distance equal to one-fourth of that between any two adjoining superposed blades. The radial arms, vertical converging plates, and rearwardly-trailing twisted blades form an effective stirring device and serve to bring into thorough contact all particles of any solid material and solvent which may be introduced into the vessel. The injection of steam, hot air, &c., into the contents of the vessel through perforated pipe 9 in many cases greatly increases the rate of solution.

The vessel and its cover are preferably of such strength as to enable a considerable superatmosphere pressure to be maintained within it, the openings 3 4 5 25 having flanged bosses to furnish tight joints with the inlet and discharge pipes. The stirrer is preferably of a conducting material, such as metal or carbon, and is connected to the positive terminal 30 of a source of electric current.

When shaft 13 is of metal and vessel 1 of ceramic material, the lower end of the shaft is preferably protected by bushing 24, also of ceramic material, ground to fit smoothly in boss 15 and secured on the squared end 23 of the shaft.

The arrangement of the blades 21 22 in spiral lines around the shaft is especially useful where a mixture of substances of different specific gravity is to be thoroughly intermingled, since it tends to continuously lift any heavier material which would otherwise gravitate to the bottom of the vessel.

To the flanged boss of outlet-opening 25 is bolted a discharge-pipe 26, having a valve 27 and an opening 31 in its upper side. To flanged boss of outlet-opening 5 is bolted a discharge-pipe 28, having a valve 29 and a downwardly-bent end, which is ground to fit into opening 31. Upon the end of pipe 26 is secured a flexible rubber hose 32, which serves to carry the ore-pulp and solution from the dissolving apparatus into any one of the filter vessels 33, here shown as three in number. Each filter consists of a vessel 41 of any suitable material. As shown, the vessel is a cylindrical tank of wooden staves held together by hoops, the bottom 42 being held in a croze in the usual manner. If the liquids to be filtered contain free acid injurious to wood, the vessel is preferably made of vitrified earthenware. A cover 43, having an inlet-opening 44, may be secured upon the vessel by any suitable means, that shown being hooks 45, pivoted upon the upper edge of the vessel and engaging staples 46 in the outer edge of the cover. On the outside of the vessel, about midway its height, are oppositely-disposed eyes 47, which may be engaged by the hooks of a lifting-crane and permit the vessel to be lifted clear from its support and turned upside down to discharge the contents thereof.

The inner wall of the vessel has shallow grooves 48, extending from the top to the bottom and shown as vertical, although they may be inclined. The upper surface of the bottom of the vessel also has shallow grooves 49, which communicate with the vertical grooves 48 and lead to an outlet-opening 50 from the bottom of the vessel. The bottom grooves are shown as converging to an outlet-opening in the side of the vessel at the level of the bottom of grooves 49; but this outlet-opening may extend through the bottom 42, if desired. The opening 50 may be provided with a faucet 51 or other closure. Within the vessel and closely fitting against the side walls and bottom is a bag 52, held in place by any suitable means, such as the circular row of hooks 53 near the upper edge of the vessel. These hooks are so shaped that the bag will easily drop off from them when the vessel is inverted. The material preferably employed for the bag is a loose textile fabric having a long nap on its inner surface, the fibers of which mat or felt closely together on the supporting-threads of the fabric proper and retain any fine particles of solid matter, although permitting free flow of liquid. At each side of outlet-opening 50 are arranged angular ribs 54, which hold the bag away from the outlet-opening and permit the escaping liquid to flow freely to and through the outlet. These ribs are cut away at a point 55 near the joint between the sides and bottom to permit the escaping liquid to flow readily behind them. For the sake of clearness the grooves are shown much enlarged in the drawings. In practice, however, I have found that these grooves may advantageously be one-fourth of an inch wide by the same or a somewhat greater depth.

Secured upon the outlet-faucet 51 of each filter is a rubber hose 58, which carries the filtrate into a long receiving-trough 59, extending beneath the outlet of each filter. Faucets 60 lead through the front wall of the receiving-trough 59 at the level of its bottom, the several faucets 60 being placed, respectively, in front of the corresponding faucets of the filters. Upon each faucet 60 is secured a rubber hose 61, which delivers the solution into the cathode vessels 62. Each cathode vessel is of earthenware, glass, or other suitable non-conducting material and contains a cathode 63, preferably an annulus of sheet metal, such as copper, hung by hooks 64 on transverse conducting-bars 65, resting on the upper edge of the vessel, one of these bars being provided with a binding-post 66, connected to the negative pole of the source of the electric current. The cathode vessels are connected by non-conducting pipes 67, ground into openings extending through their side walls near the upper edge. From the right-hand vessel 62 leads a non-conducting discharge-pipe 68, having on its end a rose 69, which serves to deliver the exhausted solution in spray or drops and prevents any short circuit between the solution in these vessels and the ground in case the dynamo or other source of electric current is not properly insulated.

Through the bottom of the dissolving vessel passes a wire 70, which is connected by hooks 71 to a wire 72, which is secured to hose 32 and extends into the filter 33 nearly to its bottom. A wire 73 leads through each filter from a point near its bottom and extends down along hose 58 nearly to the bottom of receiving-trough 59. A wire 74 leads through the front wall of the receiving-trough and is connected by hooks 75 to a wire 76, which extends down along hose 61 nearly to the bottom of each cathode vessel 62.

In the operation of this apparatus a continuous stream of ore-pulp is fed into and through the dissolving vessel and thence into one of the filters until the filter becomes filled. Hose 32 is then diverted into one of the other filters, the stream of pulp in the dissolving vessel being maintained. The filters are thus filled and allowed to empty in succession. An electric current from source of a suitably high voltage, in practice a dynamo for incandescent lighting and giving a potential difference of one hundred and ten volts, is carried by conductor 30 to the conducting-stirrer of the dissolving vessel, which is thereby constituted the anode of the electrolyzing system. The ore-pulp which is fed into the dissolving vessel preferably contains sodium chlorid or other electrolyte in aqueous solution capable of furnishing a solvent anion. The oxygen and the chlorin thus liberated on the surfaces of the anode-stirrer effect the rapid solution of any metal values contained in the ore-pulp. The solution and undissolved portions of the ore then pass in a full stream into one of the filters, this stream normally serving as a path for the current from the solution in the dissolving vessel to that in the filter. Similarly the stream of solution flowing from the outlet-hose 58 of that filter which is being filled serves to carry the electric current into the receiving-trough 59, and a stream from this trough, through a hose 61, serves to complete the electric circuit into a cathode vessel 62, the metal in the solution being deposited on the cathode 63. The wires 70 72 73 74 76 are not intended to carry any considerable portion of electric current in normal operation, but merely as safeguards to prevent the circuit from being broken in case the stream of solution between the several vessels is for any reason temporarily broken. These wires are preferably insulated, except at their ends, which are in electrical contact with any solution remaining in the lower part of each vessel.

The electric current not only serves to effect solution of the metals in the dissolving vessel and redeposition of these metals upon the cathodes, but also keeps all portions of the solution, whether in the several vessels or flowing through the connecting pipes and hoses, at a high temperature, thereby greatly increasing the efficiency of the apparatus. This arrangement also enables the ordinary dynamo used for incandescent lighting to be applied for electrolyzing without the use of the water-rheostat, lamp resistance, or other means commonly used for absorbing and wasting the greater portion of the energy delivered by the dynamo when employed for electrolytic purposes.

The dissolving apparatus herein shown is claimed in my application, Serial No. 83,901, filed November 27, 1901. The filter herein shown is claimed in my application, Serial No. 84,247, filed November 30, 1901.

Various modifications may be made in the precise construction shown and described within the scope of my generic claims. For example, a stationary anode may be employed, the various hose-pipes and wire conductors may be omitted, and in case a single filter and depositing vessel are found sufficient the receiving-trough is obviously unnecessary, the filter being then arranged to deliver directly into the depositing vessel.

I claim—

1. An electrolytic apparatus comprising, a dissolving vessel, a filter, and a depositing vessel; an anode in the dissolving vessel, a cathode in the depositing vessel, and means for conveying an unbroken stream of liquid from the dissolving vessel into the filter and from the filter into the depositing vessel, as set forth.

2. An electrolytic apparatus comprising, a dissolving vessel, a filter, and a depositing vessel; an anode in the dissolving vessel, a cathode in the depositing vessel, and means for conveying an unbroken stream of liquid from the dissolving vessel into the filter and from the filter into the depositing vessel; a metallic conductor leading from the dissolving vessel into the filter and a metallic conductor arranged to put the contents of the filter into electrical communication with the contents of the depositing vessel, as set forth.

3. An electrolytic apparatus comprising, a dissolving vessel, a plurality of filters, a receiving-trough, and a plurality of depositing vessels; an anode in the dissolving vessel, a cathode in each depositing vessel, means for conveying an unbroken stream of liquid from the dissolving vessel into each of the filters in succession, means for conveying an unbroken stream of liquid from each filter into the receiving-trough, and means for conveying an unbroken stream of liquid from the receiving-trough into each of the depositing vessels, as set forth.

4. An electrolytic apparatus comprising, a dissolving vessel, a plurality of filters, a receiving-trough, and a plurality of depositing vessels; an anode in the dissolving vessel, a cathode in each depositing vessel, means for conveying an unbroken stream of liquid from the dissolving vessel into each of the filters in succession, means for conveying an unbroken stream of liquid from each filter into the receiving-trough, and means for conveying an unbroken stream of liquid from the receiving-trough into each of the depositing vessels; a metallic conductor arranged to extend from the dissolving vessel into each filter in succession, a metallic conductor extending from each filter into the receiving-trough, and a metallic conductor extending from the receiving-trough into each depositing vessel, as set forth.

5. An electrolytic apparatus comprising, a dissolving vessel having a revoluble anode, a depositing vessel having a cathode, means for conveying an unbroken stream of liquid from the dissolving vessel, and an electric circuit including said anode and cathode, whereby the electric current is caused to traverse the stream of liquid flowing from the dissolving vessel into the depositing vessel, as set forth.

6. An electrolytic apparatus comprising, a dissolving vessel having a revoluble anode, a depositing vessel having a cathode, means for conveying an unbroken stream of liquid from the dissolving vessel into the depositing vessel, a metallic conductor arranged to put the contents of the dissolving vessel into electrical communication with the contents of the depositing vessel, and an electric circuit including said anode and cathode, whereby the electric current is caused to traverse the stream of liquid flowing from the dissolving vessel into the depositing vessel, as set forth.

In testimony whereof I affix my signature in presence of two witnesses.

LINUS P. BURROWS.

Witnesses:
 C. A. NEALE,
 EUGENE A. BYRNES.